United States Patent
Goyette et al.

(10) Patent No.: US 6,639,938 B1
(45) Date of Patent: Oct. 28, 2003

(54) METHOD FOR DYNAMICALLY ROUTING FREQUENCY HOPPING SIGNALS IN A MULTIPLE CARRIER COMMUNICATIONS SYSTEM

(75) Inventors: William R. Goyette, San Marcos, CA (US); Robert G. Riddle, San Diego, CA (US)

(73) Assignee: Northrop Grumman Corporation, Redondo Beach, CA (US)

( * ) Notice: Subject to any disclaimer, the term of this patent is extended or adjusted under 35 U.S.C. 154(b) by 0 days.

(21) Appl. No.: 09/401,896

(22) Filed: Sep. 23, 1999

(51) Int. Cl.[7] ............................................... H04B 1/713
(52) U.S. Cl. ........................................................ 375/132
(58) Field of Search ................................. 375/132, 135, 375/260, 267, 299

(56) References Cited

U.S. PATENT DOCUMENTS

| | | | |
|---|---|---|---|
| 5,329,548 A | 7/1994 | Borg | 375/135 |
| 5,719,857 A | 2/1998 | Heikkinen | 370/330 |
| 6,243,565 B1 | 6/2001 | Smith et al. | 455/101 |

*Primary Examiner*—Stephen Chin
*Assistant Examiner*—Kevin Kim
(74) *Attorney, Agent, or Firm*—Noel F. Heal

(57) ABSTRACT

A method of routing a frequency hopping signal to one of two transmitting antennas in a multiple carrier communication system is disclosed. The method comprises storing known a-priori information regarding frequency hopping signal assignments, scanning a transmitter frequency and antenna path assignment table to determine the closest existing transmitting frequency and its antenna to the frequency hopping signal to be assigned, assigning the frequency hopping signal to an available path on the other antenna, and updating the transmitter frequency and antenna path assignment table. In addition the method includes determining whether the assigned path on the other antenna conflicts with existing frequency assignments, and preempting the antenna assignment when a conflict exists.

8 Claims, 4 Drawing Sheets

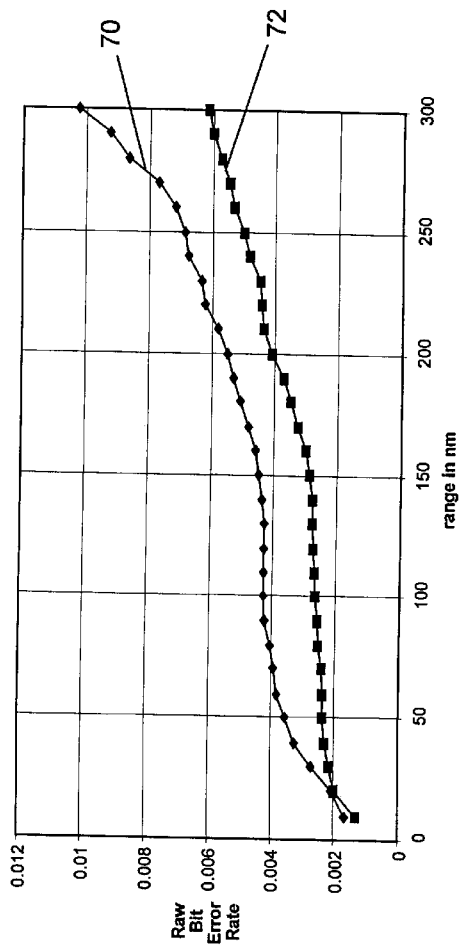

METHOD FOR DYNAMICALLY ROUTING FREQUENCY HOPPING SIGNALS IN A MULTIPLE CARRIER COMMUNICATIONS SYSTEM

BACKGROUND OF THE INVENTION

1. Field of the Invention

The present invention relates to radio frequency communications systems, and more particularly to a method for routing frequency hopping signals to antennas in a multiple carrier communications system.

2. Description of the Prior Art

Communication systems must be able to simultaneously broadcast and receive multiple radio frequency (RF) signals that share the same frequency spectrum while being susceptible to very little system degradation. This entails isolating the transmit and receive functions of the communication system, as well as, in the case of multiple transmit antennas, isolating each transmit antenna from the other transmit antennas when more than two channels are simultaneously transmitting. Isolation may be accomplished through techniques such as phase cancellation, frequency separation, and spatial separation. Spatial separation mandates that not only the transmit and the receive antennas be separated, but also that the multiple transmit antennas be separated from each other.

Achieving isolation between the antennas in a communication system is extremely difficult since there always is a signal path between the antennas, commonly referred to as a "back door path". The existence of this path makes the communication system susceptible to the deleterious effects caused by intermodulation products that may be within the transmit filter bandwidth. Intermodulation products are radiated frequencies produced by coupling of two or more carriers between the multiple transmitter amplifier outputs and also by two different frequencies combining at proximate non-linear junctions. To improve system performance these intermodulation products must be reduced, in essence by reducing the frequency mixing products that fall within adjacent receiving or transmitting channels of the system. This enables the receiving antenna to receive the relevant transmitted signals and also enables each separate transmitting coupler and antenna combination to radiate relatively clean frequencies.

What is needed, therefore, is a method of routing frequency hopping signals to one of two transmitting antennas in a multiple carrier communication system so as to minimize the production of intermodulation products and to improve system performance.

SUMMARY OF THE INVENTION

The preceding and other shortcomings are addressed and overcome by the present invention which provides generally, a method of routing a frequency hopping signal to one of two transmitting antennas in a multiple carrier communication system. Briefly, the method comprises storing known a-priori information regarding frequency hopping signal assignments, scanning a transmitter frequency and antenna path assignment table to determine the closest existing transmitting frequency and its antenna to the frequency hopping signal to be assigned, assigning the frequency hopping signal to an available path on the other antenna, and updating the transmitter frequency and antenna path assignment table. In addition the method includes determining whether the assigned path on the other antenna conflicts with existing frequency assignments, and preempting the antenna assignment when a conflict exists.

BRIEF DESCRIPTION OF THE DRAWINGS

The foregoing and additional features and advantages of this invention will become apparent from the detailed description and accompanying drawing figures below. In the figures and written description, numerals indicate the various elements of the invention, like numerals referring to like elements throughout both the drawing figures and the written description.

FIG. 4A and FIG. 4B are two tables illustrating the assignment of a transmitter frequency to an antenna path in accordance with the present invention; and FIG. 5 is a graph of a simulation output showing the raw bit error rate versus range for 16 SINCGARS VHF radios comprising a communication system utilizing the present invention.

DETAILED DESCRIPTION OF THE PREFERRED EMBODIMENTS

Figure 1:
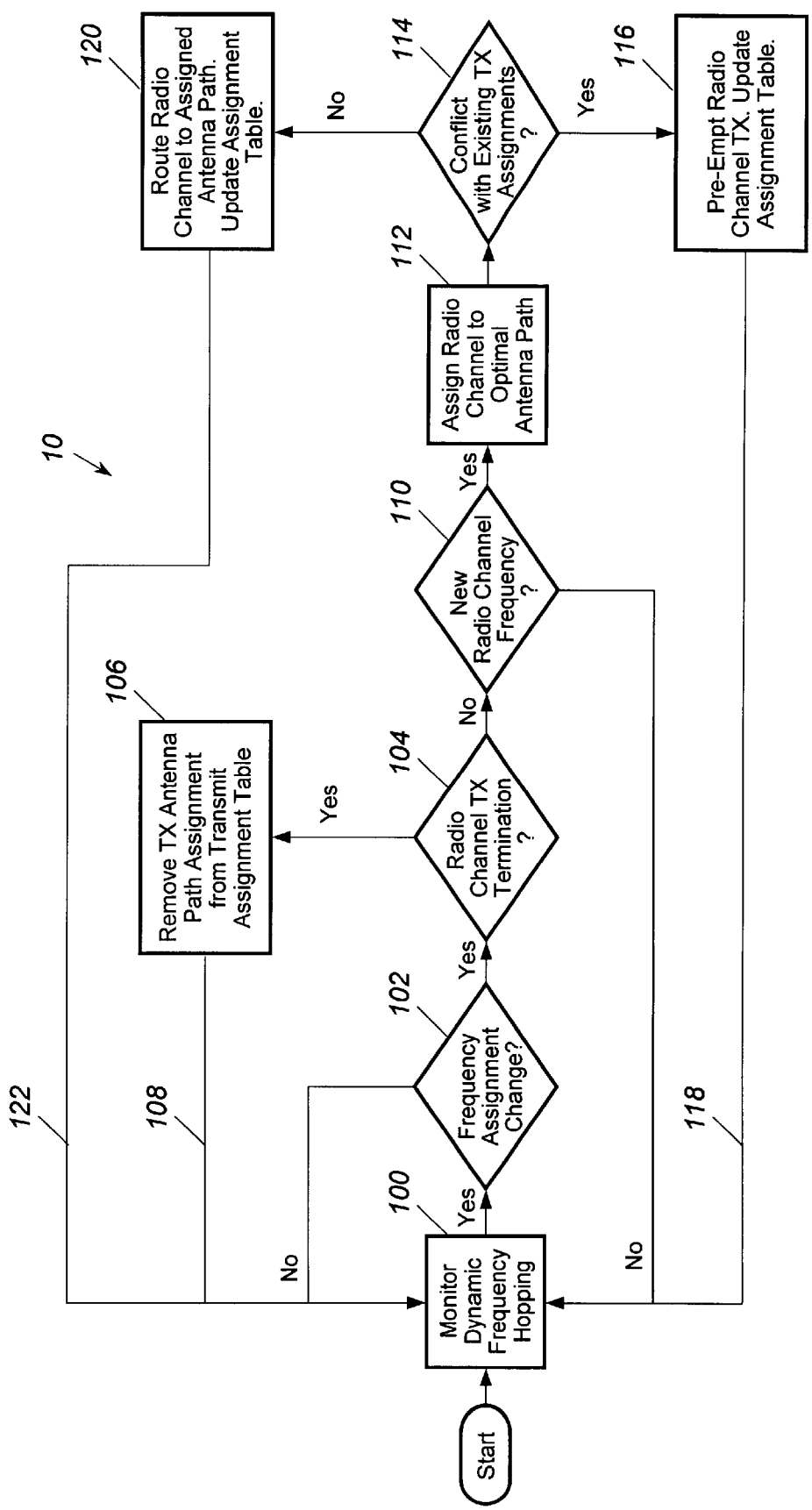
FIG. 1 is a flow chart illustrating a method of routing a frequency hopping signal to one of two transmitting antennas in a multiple carrier communication system in accordance with the present invention.

As illustrated in the flow chart of FIG. 1 a method of routing a frequency hopping signal to one of two transmitting antennas in a multiple carrier communication system 10 in accordance with the present invention is shown.

The invention is described with reference to FIG. 2 and FIG. 3 which are hardware and software implementations of the algorithm shown in FIG. 1. In the FIGS. the symbols or letters indicated below are defined to have the meanings as follows: Rx means receive, Tx means transmit, BPF means bandpass filter, LNA means low noise amplifier, T/C means timing and control, ICS means interference cancellation system, EX or Ex means exciter, R/T means receive/transmit, Modem means modulator/demodulator, N means the number of channels, FAA means frequency arbitration algorithm, and Assy means assembly.

Figure 2:
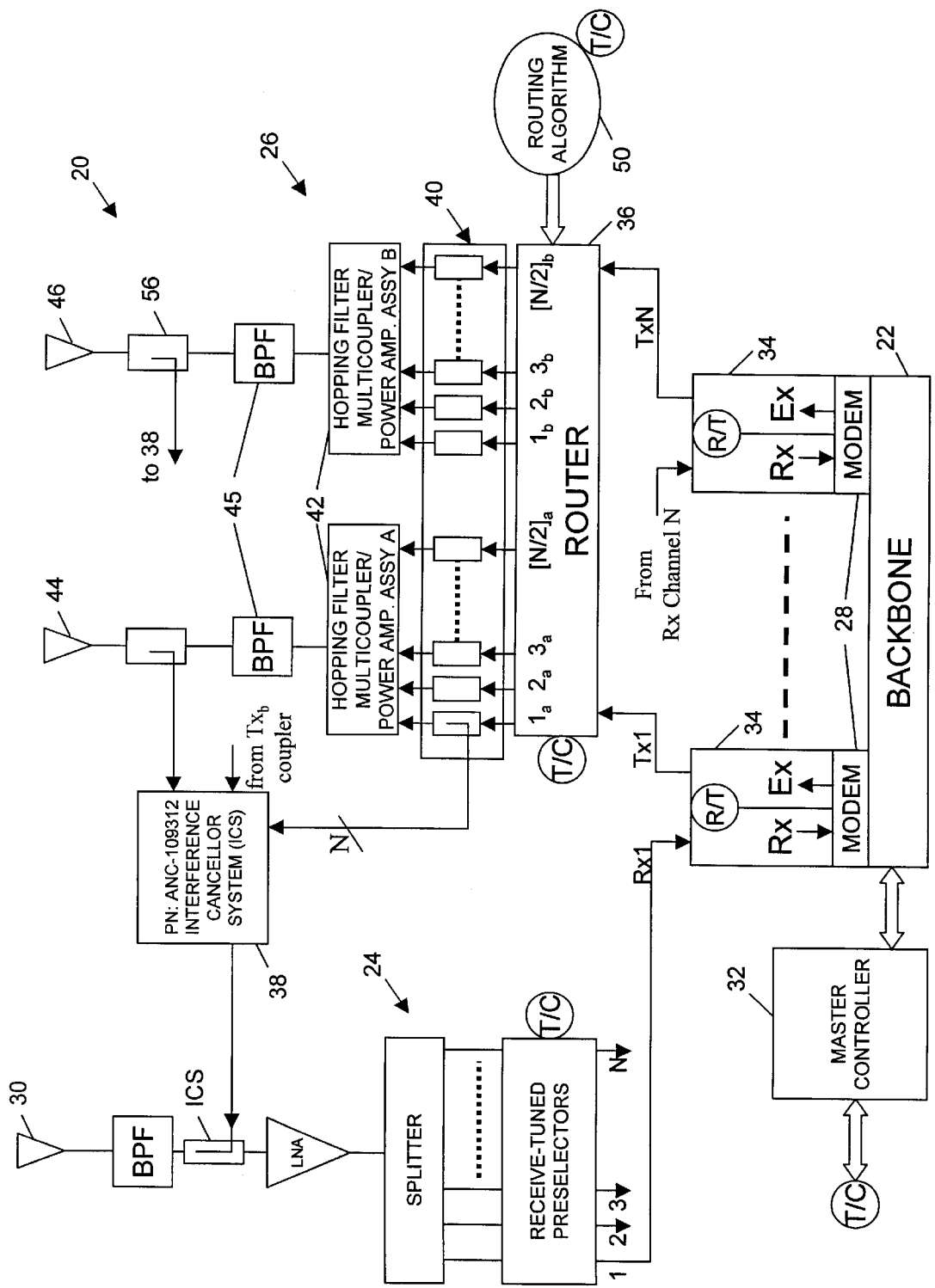
FIG. 2 is a block diagram of a hardware router embodiment of the multiple transmitter two-transmitting antenna communication system using the present invention.

With reference to FIG. 2 the hardware implementation of the algorithm is shown in a multiple carrier communication system 20. The communication system 20 is a conventional radio system, generally used in an aircraft, that comprises a transceiver, a multiple signal receiving function and a multiple signal transmitting function. A radio baseband backbone 22 routes and switches digital information received from the signal receiving function 24 and transmitted by the signal transmitting function 26 throughout the radio system. A plurality of N modems 28 when acting in the receive mode demodulates the baseband signal from the Rx channel into digital or analog information that is routed and switched by the backbone 22. When acting in the transmit mode, the corresponding modem 28 modulates a radio frequency (RF) carrier using digital information. A receive transmit switch determines the state of the modem 28. The backbone 22 and the modems 28 form part of the transceiver as will be subsequently described.

In the demodulation process, a signal is received in the receiver Rx by the receiving antenna 30. The received signal is applied to a band pass filter BPF which limits the RF front end Gaussian noise. For example when VHF-FM signals are received, the BPF is set for 30–90 MHz. The filtered signal is further processed through an interference cancellor system ICS and amplified by a low noise amplifier LNA that sets the cascaded noise figure of the RF front end and provides gain to offset noise introduced by the splitter or the N receive-tuned preselectors. The splitter divides the wideband RF signal to feed the N receive-tuned preselectors. The receive-tuned preselectors are each a narrow bandwidth filter having about a 3% bandwidth to further reduce the Gaussian noise and reduce the signal power of adjacent channels to prevent desensitization of the receiver front end. The ICS also includes N RF samplers 40 which feed forward part of the transmit signal that will be transmitted by the transmitting antennas 44 or 46. In the preferred embodiment, the ICS is an ANC-10932 interference cancellor system.

The transceiver comprises the R/T function, the Rx, the Tx, the modems 28 and the backbone 22. The R/T function recognizes that conventional receivers either transmit or receive, but not both simultaneously. The R/T is a switch that isolates the two functional subsystems of the transceiver, the receiver thread and the exciter thread. The Rx is the receiver that converts the modulated received RF signal to baseband to be processed by the modems 28.

Figure 3:
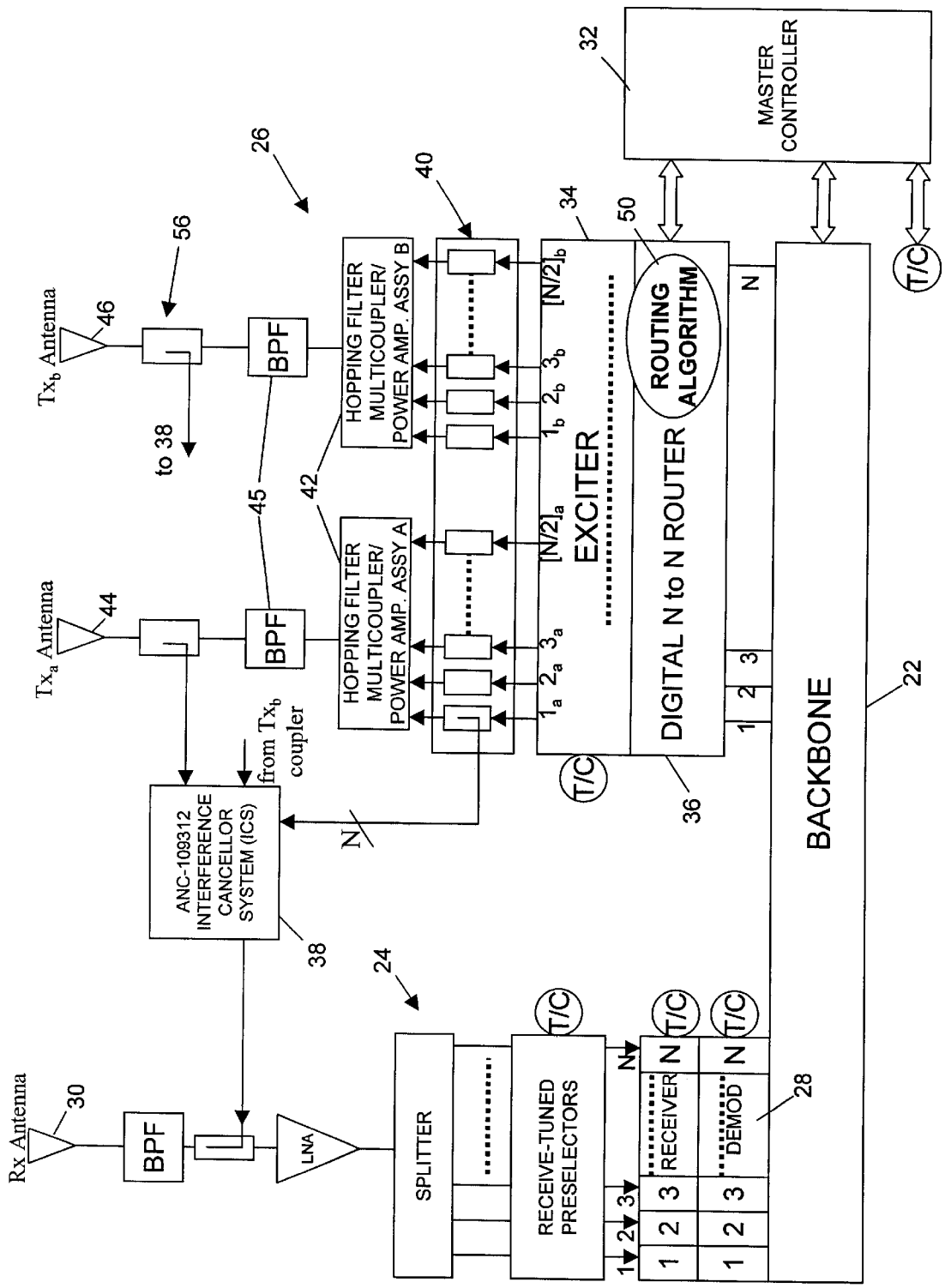
FIG. 3 is a block diagram of a software router embodiment of the communication system using the present invention.

A master controller 32 comprises an embedded processor, memory and computer software that is programmed to respond to timing and control T/C signals and serves to control all aspects of the radio system by generating other T/C signals as shown in FIGS. 2 and 3.

The transmitting portion Tx of the transceiver includes the exciter, Ex or 34, the router 36, the ICS 38 that includes an RF sampler portion 40, two hopping filter multicoupler power amplifier (PA) assemblies which combination is designated by the numeral 42, two bandpass filters 45 and two transmitting antennas 44 and 46, respectively. The exciter 34 includes N channels, each of which produces the RF carrier and has means for impressing digital or analog information on it. The router 36 includes an N×N switch matrix and appropriately and in accordance with a routing algorithm 50 and the present invention routes signals from the Tx output of each exciter to either of the two hopping filter/multicoupler/power amplifier assys 42. The dynamic router 36 under command and control of the routing algorithm 50 uses a different exciter for every hop in frequency. The RF samplers 40 of the ICS samples the RF output from the router 36 and feeds this signal to the ICS 38 to be processed and inverted and then coupled to the Rx thread. The hopping filter/multicoupler/power amp assy 42 includes a multicoupler, a power amplifier assembly and a transmit follower filter to reduce the intermodulation products caused by the non-linear properties of the power amplifiers. The multicoupler couples a plurality of carrier signals from N radios to one antenna 44 or 46, as appropriate. The power amplifier increases the amount of radiated power to be sent to the Tx antenna 44 or 46. The BPF 45 is a bandpass filter. A post power amplifier RF sampler 56 is similar to the RF samplers 40 at the output of the router 36. It should be understood that the post power amplifier transmitted energy will contain more intermodulation products but may be used to further reduce the cosite interference in the Rx thread. The two transmitting Tx antennas, 44 and 46, serve to convert the RF current supplied by the assemblies 42 to an electromagnetic signal to radiate out to free space to its associated receivers. As will be described the invention concerns a method of routing the frequency hopping transmitted signal to one of the two transmitting antennas 44 and 46.

Referring also to FIG. 3 the software implementation of the router/algorithm 50 in a conventional RF radio is shown. Many of the elements illustrated are similar to the elements comprising the hardware implementation of the router shown in FIG. 2 and described previously. More particularly, the routing algorithm 50 is provided to the master controller 32, which provides signals to the radio baseband backbone 22 and the digital N to N router 36. Feedback signals from the backbone 22 and the router 36 are also fed back to the master controller 32 as are timing and control T/C signals from other elements in the system. The exciter 34 receives baseband waveform information modulates and upconverts it to provide digital information for RF carrier conversion. Generally, this is a 16K bit per second voice data stream. It provides outputs to its output ports which are fixed channels. The channels implement the frequency hopping antenna selection in accordance with the routing algorithm.

Now, refer back to FIG. 1 and to FIG. 4. FIGS. 4A and 4B are two tables illustrating the assignment of a transmitter frequency after it has hopped from a frequency of 33 MHz shown in FIG. 4A to a new frequency of 76.5 MHz and thus new antenna path (Path 1A to 2B) shown in FIG. 4B using the routing algorithm shown in FIG. 1 to help understand the operation of the present invention. FIG. 4 includes four columns depicting the antenna path, the radio channel number, the frequency in MHz, and whether preemption is to occur. The antenna path means the antenna and the path, i.e. antenna 1, path A.

As shown in FIG. 1, the method comprises a first step 100 of dynamically monitoring the frequency hopping of the two transmitter paths 26. This requires a-priori information of frequency hopping assignments. This information is well known and is supplied to the decision block 100 by the master controller 32. Following the monitoring, a determination is made 102 as to whether there has been a change in frequency assignment. If no change has occurred, then the dynamically monitoring step 100 is again queried. If a change has occurred then a determination is made 104 as to whether the radio channel transmitter has terminated its transmission via a particular antenna path.

If the transmitter has terminated transmission as shown by block 106 it is removed from its antenna path assignment in accordance with the table shown in FIG. 4. This information is provided to the dynamically monitoring block 100 by path 108. If the transmission of a radio channel is ending, which means that the channel is going into its receive mode then the transmit antenna path is de-assigned from the carrier and removed from the antenna path column in FIG. 4.

If the radio channel transmitting is not terminating then a new radio channel frequency is needed, which determination occurs at block 110. If a new frequency is not needed then the algorithm returns to the dynamically monitoring frequency hopping block 100.

If a new radio channel frequency is required then at block 112 the radio channel is assigned to an optimal antenna path. This requires dynamically scanning or searching the frequency column in the table of FIG. 4 to find the closest existing transmitter frequency (from column 2) and its antenna path (from column 3). The radio channel is assigned to an available path on the opposite antenna from the nearest frequency neighbor. If the radio channel is to be assigned to the same antenna, then no change in the antenna path is made. This assumes that preemption is barred as will be subsequently explained. When the new radio channel is assigned and the optimal antenna path is provided then the determination is made in block 114 whether this assignment conflicts with any existing transmitter-antenna-path assignment. This determination utilizes a frequency arbitration algorithm (FAA) that is programmed into the memory of the master controller 32 and which controls the co-channel and the preempted signal. Advantageously, this determination enhances the performance of the antenna multicouplers.

The frequency arbitration algorithm determines if interference and system performance degradation will occur if a radio channel is assigned to a given transmitting antenna path. If interference and degradation would occur then any transmitting signal assignment can be preempted to allow for graceful degradation.

If the conflict is deemed to occur then the radio channel for the transmitter is preempted at block 116 and the preemption column of the tables of FIG. 4 are updated. This information regarding preemption is supplied via path 118 to the dynamic monitoring block 100.

If there is no conflict then a determination is made 120 to route the radio channel to the assigned antenna path and to also update the assignment table of FIG. 4. The radio channel is routed to a designated transmit antenna path via router 36. The routing and updated assignment information are supplied via a path 122 to the dynamic monitoring block 100.

In operation, there are certain characteristics built into the algorithm. First, it must be recognized that the router 36 can assign a radio channel to either antenna path 44 or 46 as long as there is capacity to do this in the system. However, if the transmitting antenna 44 is at full capacity then no decision is required to be made about routing the channel or frequency. Hence, the channel shall not be routed to the full capacity transmitting antenna 44 and it must be routed to the antenna 46. Moreover, it is assumed that the radios are transmitting on average fifty percent of the time. The probability of there being an open slot on an antenna is equal to 1−M/2 N, where M is the number of antennas and N is the number of radios. Assuming a random distribution of signals between the antennas, for example, for eight signals being provided to the two antennas, there is an open slot on each antenna 93.7 percent of the time.

Transmitter routing works in accordance with the following. The distribution of signals to each antenna is known. The hopping frequencies change constantly at a given hop rate. When a carrier hops it will be assigned to the antenna that allows for the maximum spacing between frequencies. Also, hopping radios are not necessarily synchronized with respect to actual hop times. Therefore, coherency between alternative exciter/up conversion paths may be required to allow the assignment of any radio in real time to the appropriate antenna path. This can be provided by the appropriate timing and control (T/C) signal.

When two frequencies have overlapping filters, the third order intermodulation products that are generated will be attenuated by the isolation between the two transmitting antennas. Also, it should be recognized that if the amplifier is turned off during a hop, bit errors occur. Should this happen the message may not arrive at a remote receiver or it is unintelligible. However, interleaving allows for graceful degradation even if an entire hop's worth of data is lost.

Assuming that the two frequencies are within the transmit filter pass band, they can be separated or routed through a switch matrix to the two isolated transmitting antennas 44 and 46. Alternatively, if a software radio implementation is used the baseband data can be routed through the software radio backbone 22 to the appropriate hardware exciter/transmitter path driving the appropriate antennas. This will reduce the intermodulation product power by between 10 and 15 dB.

Now, with reference to FIG. 4, antenna 1 means transmitting antenna 44, antenna 2 means transmitting antenna 46 and there are eight paths, namely A–H associated with each antenna. As shown in FIG. 4A radio channels 7, 3, 15, 11, 8, 1 and 12 are assigned initially to the transmitting antenna 44. No channel is assigned to antenna path 1D. Radio channels 2, 5, 14, 16, 9 and 13 are assigned to the transmitting antenna 46 (i.e. antenna 2). No radio channels are Initially assigned to antenna paths 2B and 2F. In the system, radio channel 7 transmitting at 33 MHz has completed transmission and is hopping to transmit frequency 76.5 MHz. With reference to FIG. 4A, note that the closest frequency to the radio channel 7 at new frequency 76.5 MHz is transmitting frequency 76 MHz on radio channel 11 on antenna path 1E. Thus, to minimize intermodulation products the algorithm monitors the frequency hopping in block 100, recognizes in block 102 that a frequency assignment change is to be made, recognizes in block 104 that channel 7 at 33 MHz has terminated transmitting, removes, in block 106, the antenna path from the table in FIG. 4A, recognizes, in block 100, that the channel 7 has hopped to 76.5 MHz, passes through the blocks 102 and 104 and assigns, inblock 110 76.5 MHz as the new frequency for radio channel 7. Since antenna paths 1A (now open), 2B and 2F are available, the algorithm causes the router 36 to route radio channel 7 to the transmitting antenna 46 and more particularly to antenna path 2B. This is because the closer frequencies to 76.5 MHz are at antenna path 2E at 87.8 MHz. No preemption occurs. This assignment is reflected in FIG. 4B.

FIG. 5 illustrates a graph showing the raw bit error rate (BER) versus range in nautical miles nm for 16 single channel ground and airborne radio system (SINCGARS) VHF radios. This shows a sample Monte-Carlo simulation to gauge the effectiveness of transmitter signal routing in accordance with the present invention. In making the calculation it was assumed that 16 radios were synchronous; 15 synchronous transmit radios are turned on 100 percent of the time on a common aircraft and the signals are sorted in frequency space and alternatively assigned to transmit antenna 44 and then to transmit antenna 46. There was one synchronous receiver. The BPF filters were three percent band width Rx/Tx filters that has 3 dB bandwidths that were approximately 1 MHz wide, and there were 30 dB of separation between the transmitter and the receiver and 15 dB separation between the transmitter to transmitter. There were 40 dB of transmitter ICS and 30 dB of receiver ICS. Co-channel and adjacent channel transmitter carriers were preempted if they could not be routed to separate transmit antennas. Graph 70 shows system performance without routing of the transmit antennas, i.e., random assignment of carriers. Graph 72 shows the raw bit error rate when the transmitters were routed in accordance with the present invention, i.e., using best case frequency sorting and alternate antenna assignments. It can be seen that for a 60 nm range between the receiver and the transmitter on the ground, the BER decreased by a factor of two using the dynamic routing algorithm invention.

In a preferred embodiment the transmitting antennas 44 and 46 each includes eight channels. The effectiveness of routing the radios is dependent upon the actual system configuration. Since the decrease in intermodulation product power is in proportion to the transmitting antenna isolation, maximizing the isolation between the transmitting antennas without increasing the coupling between the transmitter and the associated receiver is desirable. The spatial isolation due to the separation of the antennas provides 15 dB of isolation. Back door third order intermodulation products between transmitting power amplifiers are reduced by 15 dB and 30 dB due to isolation. The eight radios associated with each antenna are not hard wired and are not within the same filter band width. The power amplifier is one manufactured by Collins Radio and designated by them as Model Q and has wideband characteristics. The bandpass filters are digitally tunable filters. The multicoupler is similar to the FHMUX (frequency hopping multiplexer) manufactured by Xetron and utilized for VHF or UHF frequencies. Alternatively it may be a switch multicoupler. Also the effectiveness in transmitter signal routing as a co-site interference mitigation technique is achieved because the back door intermodulation products become significant as co-site interference mechanisms once the standard phase cancellor/preselector/preemptive transmitter scheduling co-site measures are applied to minimize the interference effects of the primary carriers.

Systems of the type shown could be used for an airborne communications node (ACN), for Army $C^2I$ Shelters, Army RAH-66 Commanche Helicopters and Navy DD21 Surface Combat Ships. In general this dynamic routing invention can be used for any platform that receives or transmits a plurality of RF signals sharing a common electromagnetic spectrum whether it be airborne, terrestrial-based or sea-based platforms.

It will be appreciated by persons skilled in the art that the present invention is not limited to what has been shown and described hereinabove. The scope of the invention is limited solely by the claims which follow.

What is claimed is:

1. A method for routing a frequency hopping signal to one of two transmitting antennas in a multiple carrier communications system comprising:

storing known a-priori information regarding frequency hopping signal assignments;

scanning a transmitter frequency and antenna path assignment table to determine the closest existing transmitting frequency to the frequency hopping signal to be assigned and to determine the antenna associated with the closest existing transmitting frequency;

assigning the frequency hopping signal to an available path on the other antenna, which is not associated with the closest existing transmitting frequency;

determining whether the assigned path on the other antenna conflicts with existing frequency assignments; and updating the transmitter frequency and antenna path assignment table.

2. A method as set forth in claim 1, and further comprising preempting the antenna assignment when a conflict exists, and updating the transmitter and antenna assignment table to reflect the conflict.

3. A method as set forth in claim 2, wherein the step of determining whether the assigned path conflicts comprises using a frequency arbitration algorithm to determine if a conflict will exist if the frequency hopping signal is assigned to the assigned antenna path.

4. A method as set forth in claim 1, and further comprising determining when one of the existing transmitting frequencies has terminated transmitting, and removing the corresponding transmitter frequency and its antenna path assignment from the transmitter frequency and antenna path assignment table.

5. A method as set forth in claim 1, and further comprising determining when one of the existing transmitting frequencies has terminated transmitting, removing the corresponding transmitter frequency and its antenna path assignment from the transmitter frequency and antenna path assignment table, and updating the transmitter frequency and antenna path assignment table.

6. A method as set forth in claim 1, and further comprising routing the frequency hopping signal to its assigned path.

7. A method as set forth in claim 1, and further comprising routing the frequency hopping signal to its assigned path via a software router.

8. A method as set forth in claim 1, and further comprising routing the frequency hopping signal to its assigned path via a hardware router.

* * * * *